US007219437B2

(12) United States Patent
Dallman

(10) Patent No.: US 7,219,437 B2
(45) Date of Patent: May 22, 2007

(54) LASER GUIDED WORK DEVICE

(76) Inventor: Brent Dallman, 8830 W. 52nd, Indianapolis, IN (US) 46234

( * ) Notice: Subject to any disclaimer, the term of this patent is extended or adjusted under 35 U.S.C. 154(b) by 0 days.

(21) Appl. No.: 11/170,009

(22) Filed: Jun. 29, 2005

(65) Prior Publication Data

US 2006/0168830 A1 Aug. 3, 2006

Related U.S. Application Data

(63) Continuation-in-part of application No. 11/045,410, filed on Jan. 28, 2005.

(51) Int. Cl.
*G01C 15/00* (2006.01)

(52) U.S. Cl. .......................... 33/286; 33/18.2; 33/566; 33/DIG. 21

(58) Field of Classification Search ................ 33/18.1, 33/18.2, 41.1, 41.4, 484–485, 492, 562, 566, 33/DIG. 21, 41.2, 286, 274, 275 R, 20.1
See application file for complete search history.

(56) References Cited

U.S. PATENT DOCUMENTS

| | | | | |
|---|---|---|---|---|
| 3,875,396 | A * | 4/1975 | Webb | 362/99 |
| 4,455,751 | A * | 6/1984 | Held | 33/18.1 |
| 4,654,762 | A * | 3/1987 | Laverick | 362/97 |
| 4,679,328 | A * | 7/1987 | Saad | 33/447 |
| 5,050,306 | A * | 9/1991 | Renaud | 30/293 |
| 5,337,484 | A * | 8/1994 | Cardon | 33/41.2 |
| 5,680,709 | A * | 10/1997 | Stone | 33/613 |
| 5,823,500 | A * | 10/1998 | La Coste | 248/444 |
| 5,915,807 | A * | 6/1999 | Ilagan | 33/471 |
| 6,536,126 | B2 * | 3/2003 | Wilson | 33/477 |
| 6,735,879 | B2 * | 5/2004 | Malard et al. | 33/286 |
| 6,782,629 | B2 * | 8/2004 | Jimenez et al. | 33/483 |
| D498,554 | S * | 11/2004 | Agresto, Sr. | D26/51 |
| 6,851,196 | B1 * | 2/2005 | Fry Leever et al. | 33/483 |
| 2002/0066195 | A1 * | 6/2002 | Gwon | 33/437 |
| 2004/0143979 | A1 * | 7/2004 | Albright et al. | 33/42 |

* cited by examiner

*Primary Examiner*—Yaritza Guadalupe-McCall
(74) *Attorney, Agent, or Firm*—Sarah M. Jabbari; Sommer Barnard PC

(57) ABSTRACT

A laser guided work device including a work board having a work surface, a line producing laser projecting a line on the work surface, and a linear motion device engaging the laser to the work board. The linear motion device translates the laser relative to the work surface along at least one dimension. The line is oriented perpendicular to the at least one dimension such that the line moves relative to the work surface when the linear motion device translates the laser along the at least one dimension.

18 Claims, 19 Drawing Sheets

LASER GUIDED WORK DEVICE

PRIORITY REFERENCE

This application is a continuation-in-part application of pending U.S. patent application Ser. No. 11/045,410 filed on Jan. 28, 2005 in the name of Brent Dallman and entitled LASER GUIDED WORK DEVICE.

BACKGROUND OF THE INVENTION

1. Field of the Invention

The present invention relates to a work device that provides a work surface on which the user can write directly or position a paper for writing thereon.

2. Description of the Related Art

There are several situations in which free-hand writing is necessary or desired. For instance, free-hand writing is typically desired when writing a personal letter on personal stationary, preparing a personalized greeting card, and/or addressing an envelope. In addition, teachers, professors and other instructors must often write in free-hand when writing on a classroom chalkboard or dry erase board. Finally, the art of calligraphy also typically requires the writer to write in free-hand. Unfortunately, when writing free-hand, it is very difficult to write in a straight line. Quite often the writing moves up and/or down on the writing surface thereby resulting in an unattractive written product, which uses more writing surface space than necessary and/or may be difficult to read.

To solve this problem, many writers have resorted to drawing a straight line on the writing surface using a pencil and then erasing the pencil line after the writing is completed. Unfortunately, this method can leave unsightly eraser marks or leftover pencil marks. In addition, the eraser may smear the writing. In the classroom setting, some chalkboards have been provided with lines to guide the writer. However, these lines are permanent and their size and location cannot be adjusted according to the writer's needs. Similar problems arise in engraving, sign-making and other like activities. For instance, it is difficult for an engraver to engrave in a straight line without the guide of a line. It is also difficult for a sign-maker or graphic artist to position letters, characters or other objects on a sign, shirt, plaque or other article.

Accordingly, a need remains for a device that provides a work surface capable of guiding the user in writing in a straight line.

SUMMARY OF THE INVENTION

The present invention, in one form thereof, is a laser guided work device including a work board having a work surface, a line producing laser projecting a line on the work surface, and a linear motion device engaging the laser to the work board. The linear motion device translates the laser relative to the work surface along at least one dimension. The line is oriented perpendicular to the at least one dimension such that the line moves relative to the work surface when the linear motion device translates the laser along the at least one dimension.

In another aspect, the present invention is a laser guided work device including a work board having a work surface and a line producing laser slidably engaged to the work board such that the laser slides relative to the work surface along at least one dimension. The laser projects a line on the work surface. A holding device positions and holds a paper against the work surface.

In yet another form, the laser guided work device includes a work board having a work surface, a line producing laser projecting a line on the work surface, a linear motion device affixed to the work board and engaging the laser to the work board, and a locator gauge. The locator gauge includes a plurality of measurement markings defined on the work surface. The markings indicate the location of the line. The linear motion device translates the laser relative to the work surface along at least one dimension. The line is oriented perpendicular to the at least one dimension such that the line moves relative to the work surface when the linear motion device translates the laser along the at least one dimension.

In another form, the present invention provides a guide device for guiding writing on a work surface of a work board. The guide device includes a linear motion device attachable to the work board and a line producing laser engaged to the linear motion device and positioned to project a line on the work surface of the workboard. The linear motion device translates the laser relative to the work surface along at least one dimension. The line is oriented perpendicular to the at least one dimension such that the line moves relative to the work surface when the linear motion device translates the laser along the at least one dimension.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
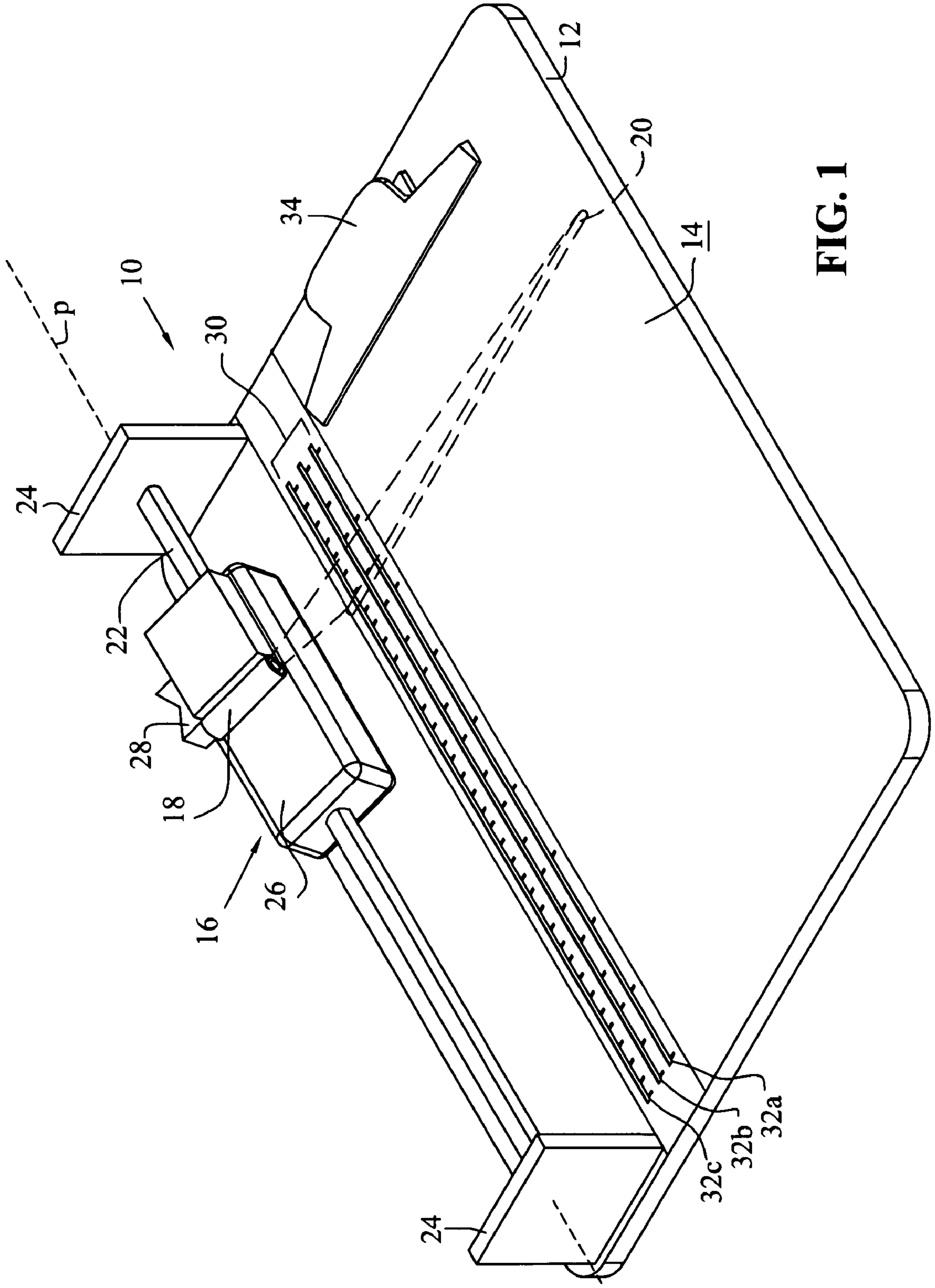
FIG. 1 is a perspective view of a device according to one embodiment of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 2:
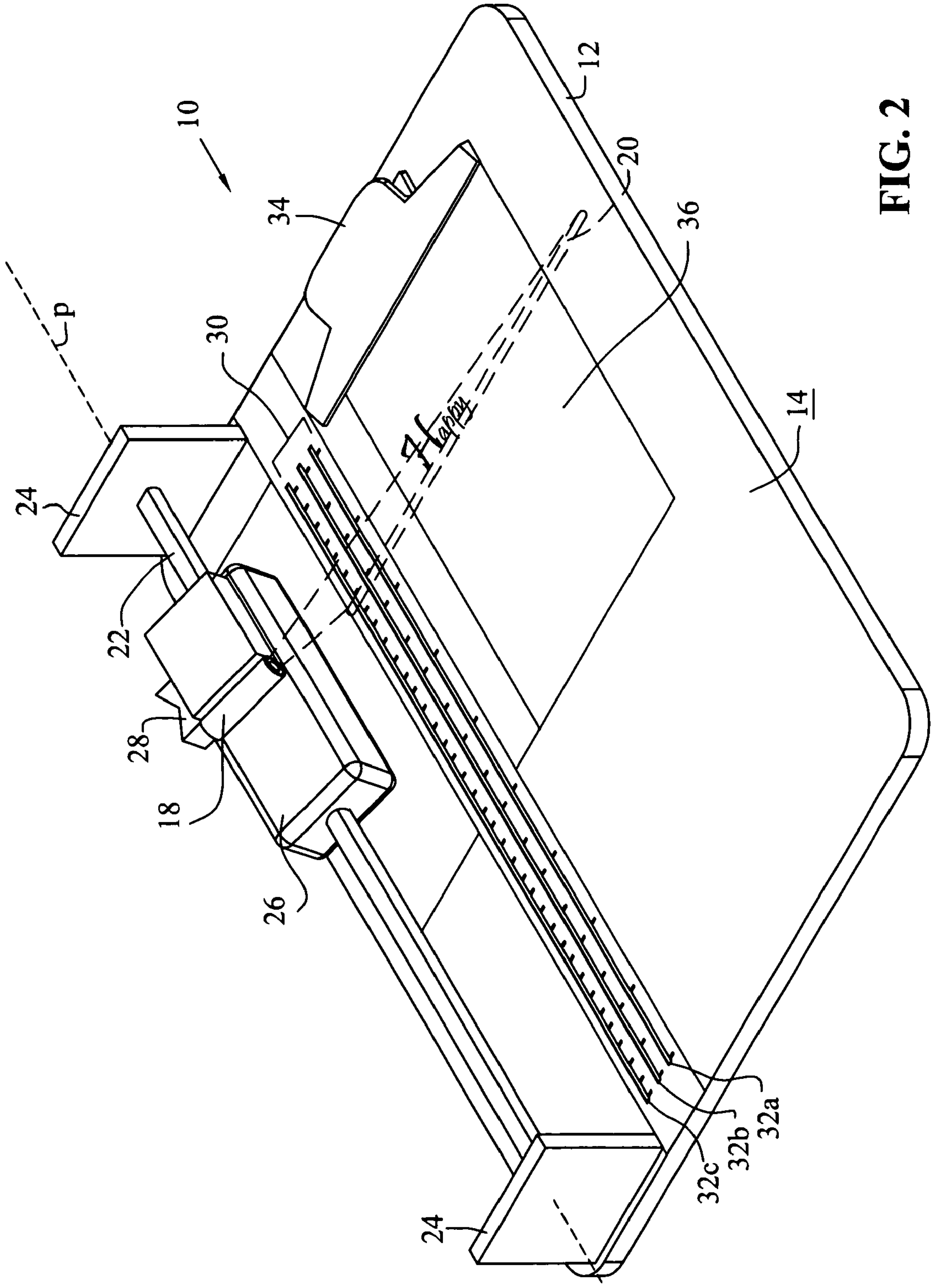
FIG. 2 is a perspective view of the device of FIG. 1 when in use.

Referring first to FIGS. 1 and 2, laser guided work device 10 according to one embodiment of the present invention is illustrated. Laser guided work device 10 generally includes work board 12, laser 18 and linear motion device 16. Work board 12 is a hard, rigid structure having work surface 14. Work board 12 may be formed from any rigid material, including for example, metal, vinyl, plastic, PVC (polyvinyl chloride), wood, cardboard, glass, porcelain, or any combination thereof. Furthermore, board may be coated to provide a desired texture. For instance, work board 12 may be formed of metal with a vinyl coating to provide a smooth writing surface.

Linear motion device 16 is mounted on work board 12 and includes rail 22, rail supports 24 and trolley 26. Rail 22 is supported on work board 12 by rail supports 24, which are positioned at either end of rail 22 and are attached to work board 12. Rail 22 is aligned along dimension P, which runs along the vertical length of work board 12 and is positioned adjacent to the left edge of work board 12.

Trolley 26 is slidably engaged with rail 22 such that trolley 26 translates along dimension P relative to work board 12. Trolley 26 includes lock switch 28 which is operably coupled to a locking device (not shown) of trolley 26. Locking device is adapted to secure trolley 26 in position on rail 22 when lock switch 28 is in a locked position. Locking device permits trolley 26 to slide on rail 22 when locking switch 28 is in an unlocked position.

Laser 18 is mounted on trolley 26 for sliding movement therewith along dimension P. Laser 18 is adapted to generate a light that forms straight line 20 and is positioned to project line 20 onto work surface 14 such that line 20 is perpendicular to dimension P. Laser 18 may be any line generating laser including, for example, a laser diode module. The laser may produce any color or wavelength of light. For instance, one embodiment employs a semiconductor laser that produces a red line having a wavelength of 635–650 nm. Alternatively, lasers producing green lines and/or lines having varying wavelengths may be used. In addition, laser 18 may be powered by any means including by battery or AC.

Figure 3:
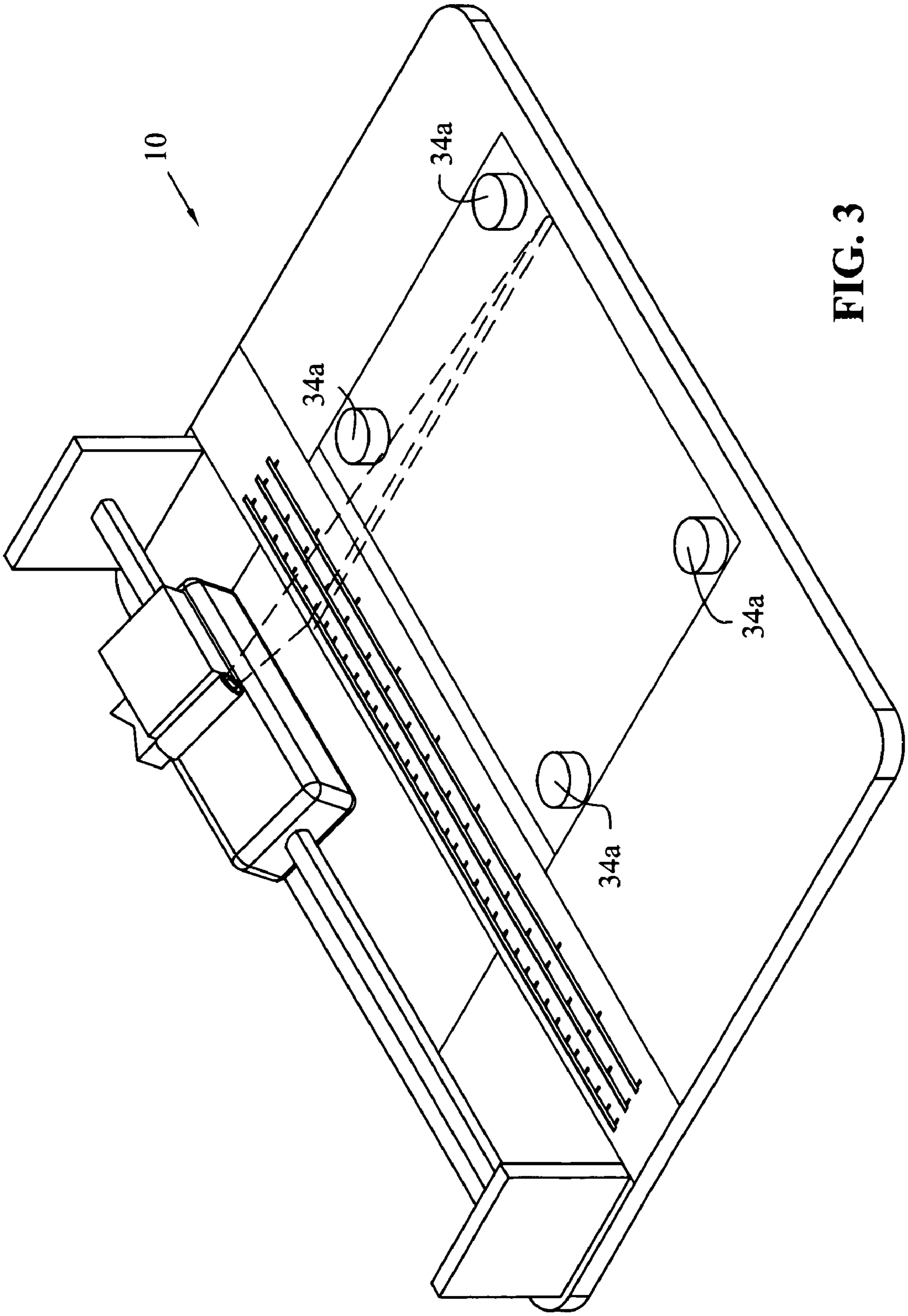
FIG. 3 is a perspective view of a device according to another embodiment of the present invention.

As illustrated in FIGS. 1 and 2, work board 12 also includes holding device 34 for positioning and holding paper 36 against work surface 14. Paper 36 is intended to refer generally to any object on which a straight line is needed to guide the user. For instance, paper 36 may be a sheet of stationary paper, card stock paper, standard printer paper, plastic sign board, wood (such as a wood plaque), metal or any other material on which a user would like to align objects or words. Holding device 34 may be in the form of a clip such as that on a conventional clip board. Alternatively, magnets 34*a* illustrated in FIG. 3, flexible band, or other device could serve as a holding device.

Work board 12 also includes line locator gauge 30 adapted to guide the user in positioning and determining the location of line 20. Gauge 30 includes measurement markings 32*a*, 32*b*, 32*c* imprinted or engraved on work surface 14. Measurement markings 32*a*, 32*b*, 32*c* may be scaled in any useful increments. For instance, markings 32*a* may correspond to one inch increments, markings 32*b* to ½ inch increments, and markings 32*c* to ¼ inch increments.

Referring now to FIG. 2, an exemplary use and operation of laser guided work device 10 will now be described. Device 10 may be used to make a customized birthday card. The user positions and secures a sheet of card stock paper 36 on work surface 14 using holding device 34. The user turns on laser 18 using the on/off switch (not shown). Laser 18 projects line 20 onto paper 36. The user then slides trolley 26 along rail 22 until laser line 20 is aligned with the desired measurement marking 32*a–c*. The user then engages locking switch 28 to lock trolley 26, and thereby line 20, in place. The user may then write the desired message, in this case the phrase "Happy Birthday," in a straight line on paper 36 using line 20 as a guide. If a second line of writing is desired, the user unlocks locking switch 28 and slides trolley 26 until laser line 20 is aligned with the desired measurement marking 32*a–c*, and trolley 26 is locked in position. The user may then write the next message in a straight line spaced apart from the first message.

Figure 4:
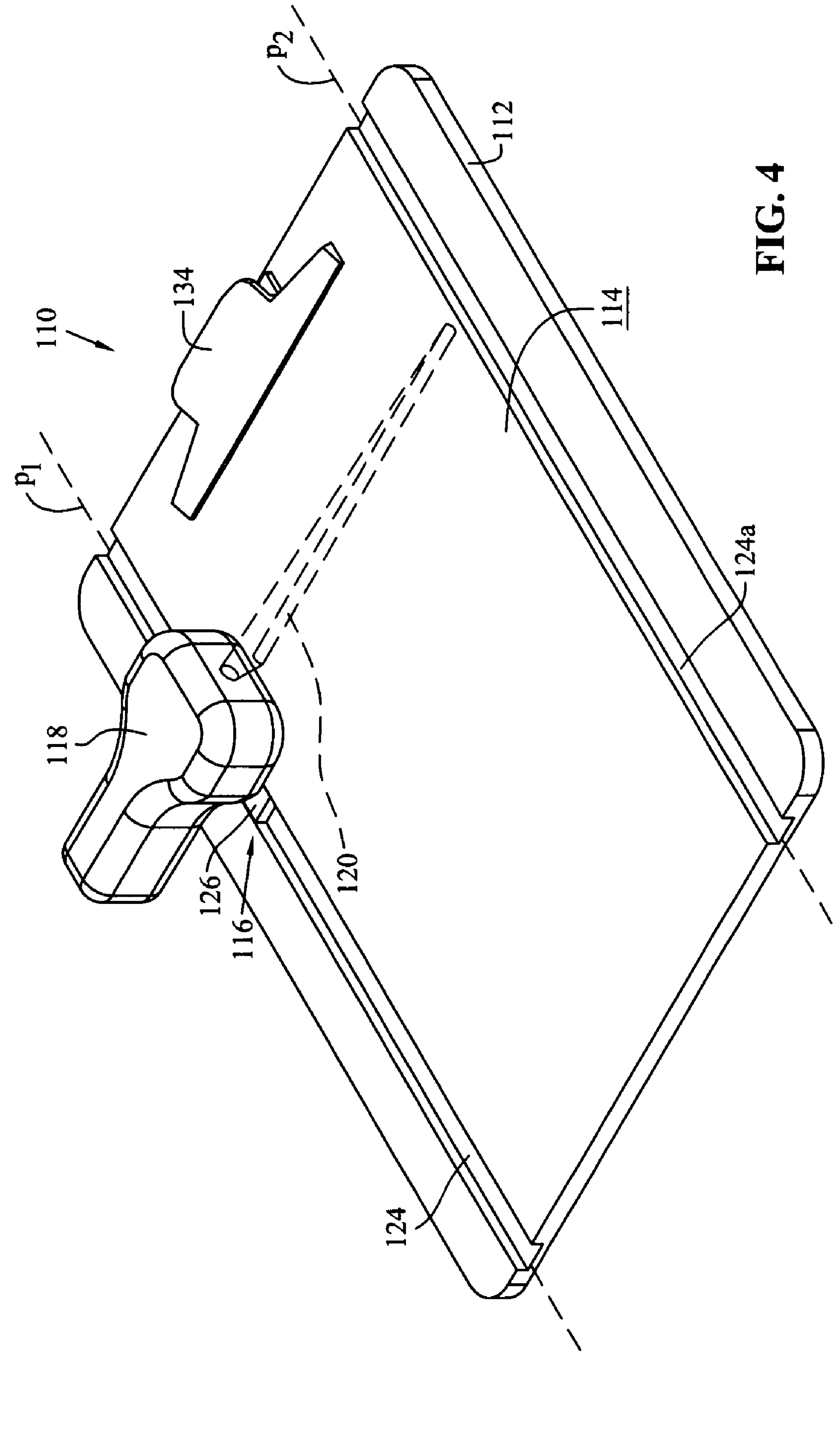
FIG. 4 is a perspective view of a device according to another embodiment of the present invention.
Figure 5:
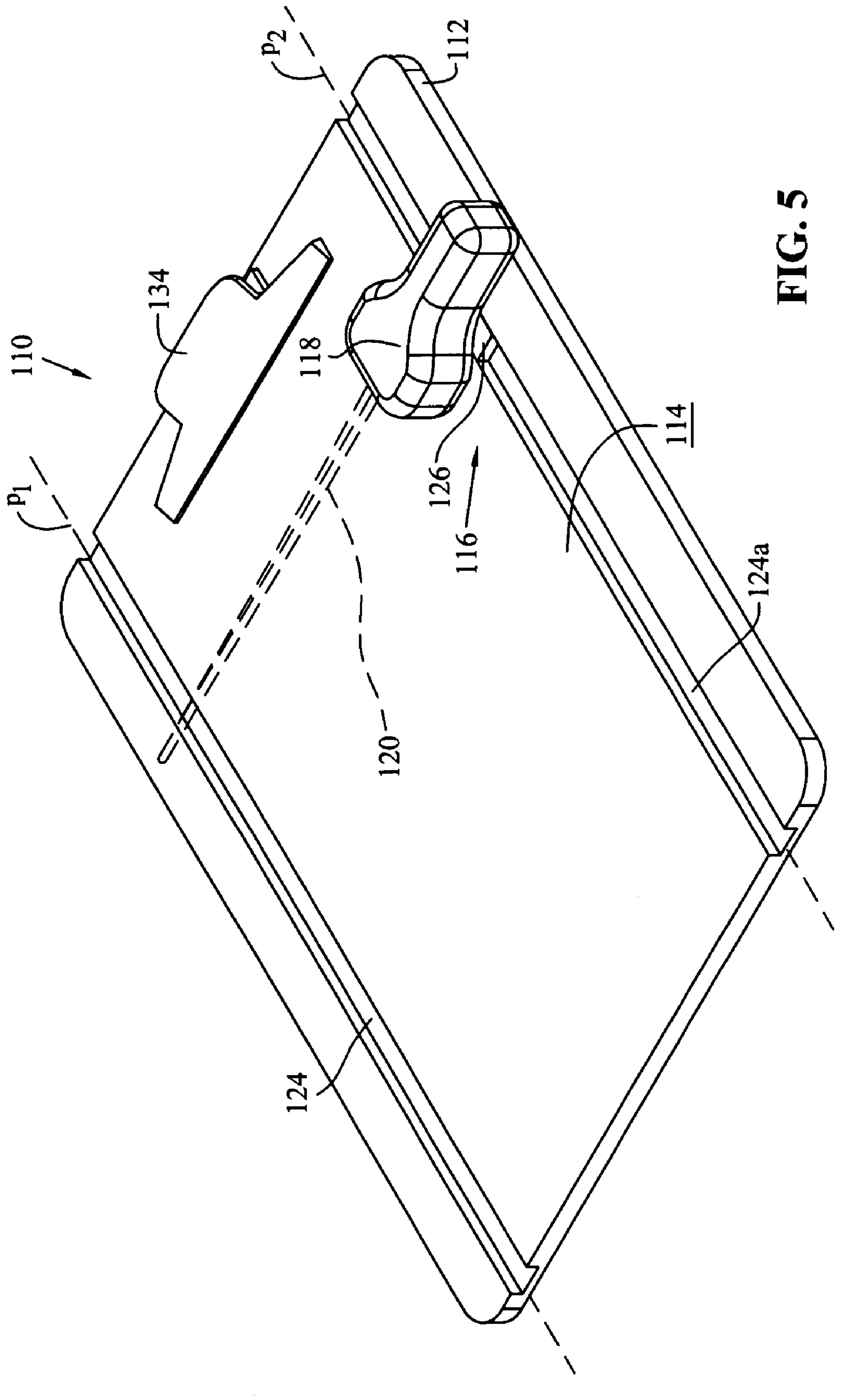
FIG. 5 is a perspective view of the device of FIG. 4 with the laser positioned on the opposite side of the work board.
Figure 6:
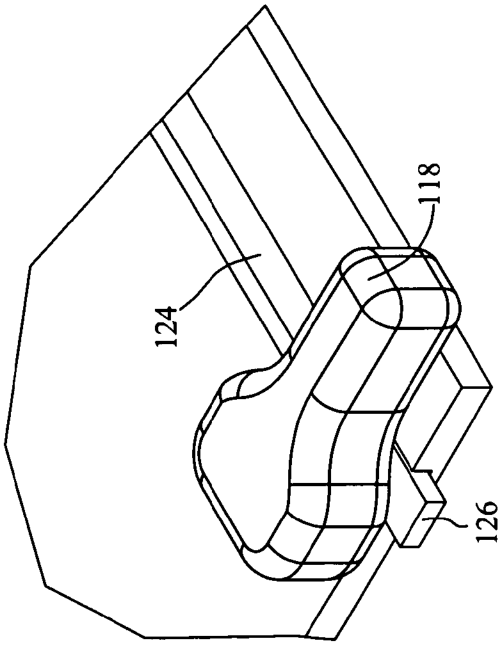
FIG. 6 is a perspective view of a portion of the device of FIG. 4.
Figure 7:
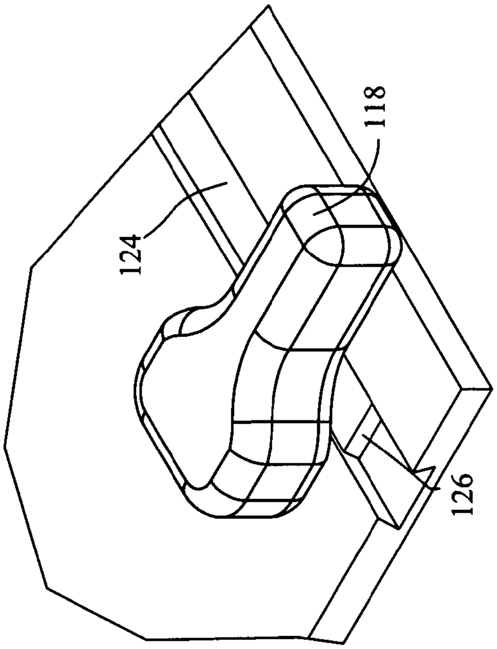
FIG. 7 is a perspective view of an alternative embodiment for the portion shown in FIG. 6.
Figure 8:
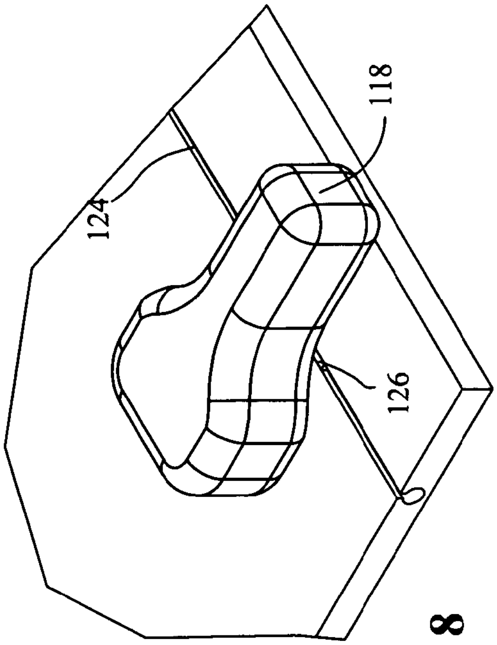
FIG. 8 is a perspective view of an alternative embodiment for the portion shown in FIG. 6.

Referring now to FIG. 4, another embodiment of the present invention is illustrated. Similar to the embodiment discussed above, laser guided work device 110 generally includes work board 112, linear motion device 116, and laser 118. Work board 112 includes work surface 114. Linear motion device 116 includes groove 124 and tongue 126 slidably engaged within groove 124. Groove 124 is defined in work surface 114 of work board 112 and extends along dimension $P_1$, which runs vertically along the left side of work board 112. Laser 118 is mounted on tongue 126 for sliding therewith along dimension $P_1$ and is positioned such that it projects line 120 on work surface 114. As shown in FIGS. 4–8, groove 124 and tongue 126 have cross-sectional shapes that are complementary to one another, such that tongue 126 securely but slidably fits within groove 124. For instance, as illustrated in FIGS. 4–6, groove 124 and tongue 126 may have a rectangular cross-sectional shape. Alternatively, groove 124 and tongue 126 may have a dove-tail cross-sectional shape, as shown in FIG. 7. As shown in FIG. 8, groove 124 and tongue 126 may have a circular or keyhole cross-sectional shape. Of course, the groove and tongue may have any shape suitable for slidably securing tongue within groove.

As shown in FIGS. 4 and 5, linear motion device 116 may also include second groove 124*a* defined in work surface 114 and extending along dimension $P_2$, which runs vertically along the right side of work board 112. Tongue 126 may be slid out of groove 124 and slidably engaged within groove 124*a*, such that laser 118 is positioned on the right side of work board 112. Laser 118 projects line 120 on work surface 114 from its position on the right side of work board 112. This configuration simplifies use of the device by a left-handed person because the user's hand does not block the light projected by laser 118. In addition, having both grooves 124 and 124*a* provides versatility by accommodating either right-handed or left-handed users simply by moving laser 118/tongue 126 assembly between grooves 124 and 124*a*.

Although not shown above in FIGS. 1 and 2, work device 10 may also be adapted to more adequately accommodate both right-handed and left-handed users by adding another rail and rail supports on the right hand of the work board and providing a trolley that may be removed from rail 22 and repositioned on the additional rail.

Figure 9:
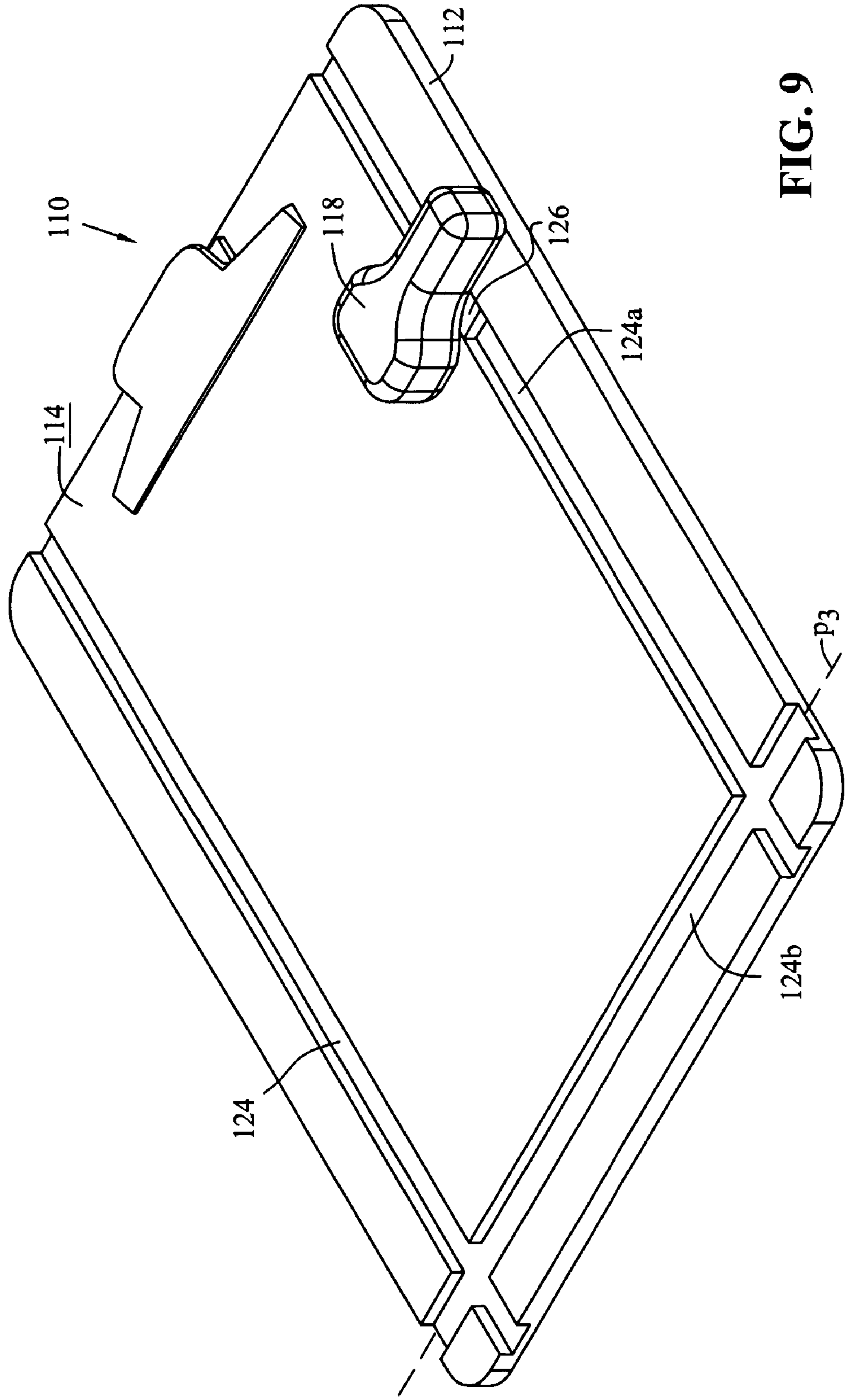
FIG. 9 is a perspective view of a device according to yet another embodiment of the present invention.
Figure 10:
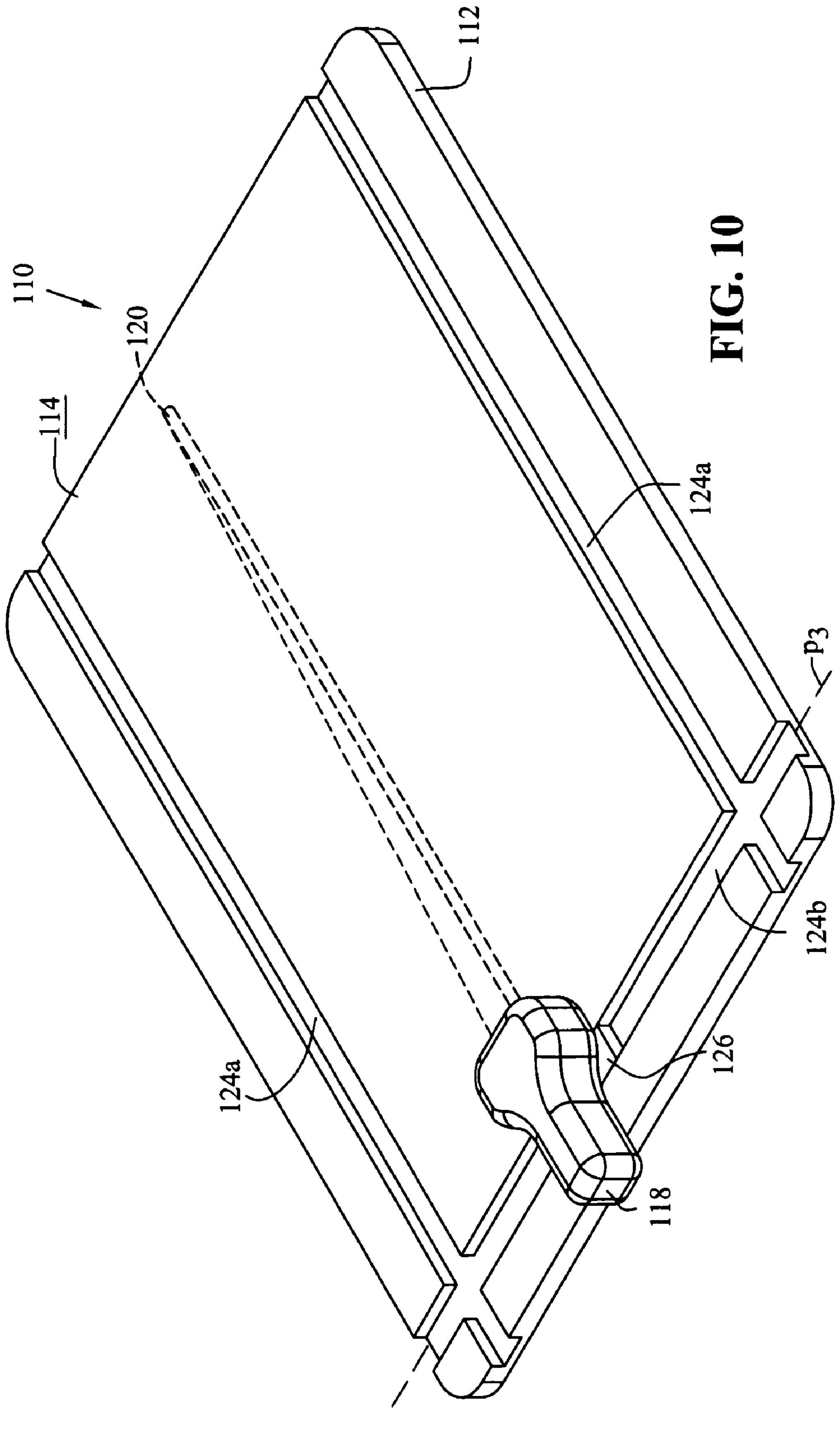
FIG. 10 is a perspective view of a device according to yet another embodiment of the present invention.
Figure 11:
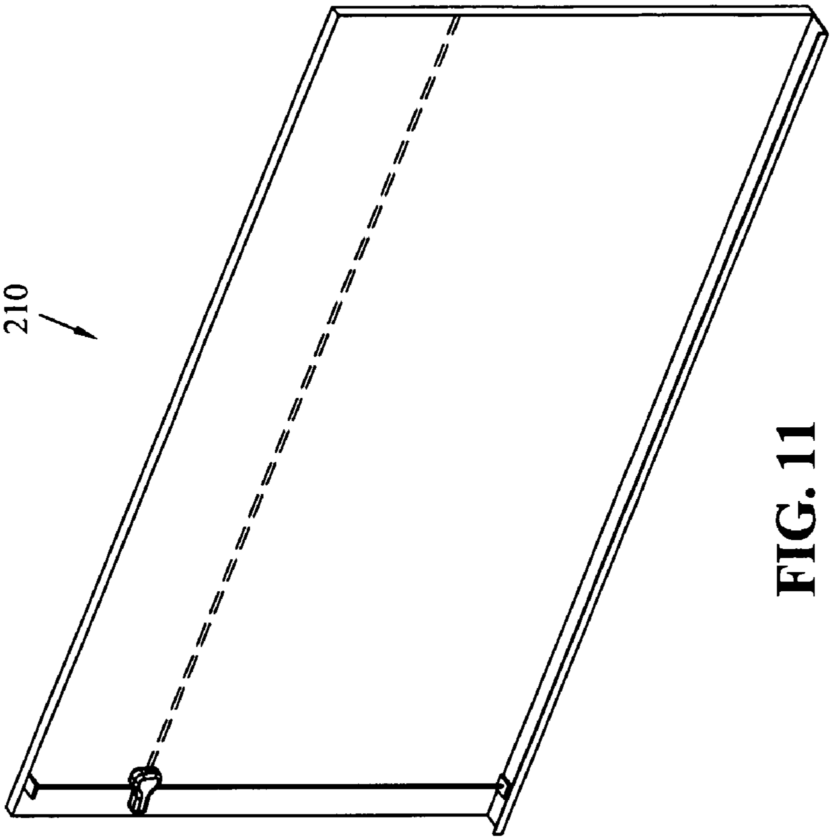
FIG. 11 is a perspective view of a device according to yet another embodiment of the present invention.

As shown in FIGS. 9–10, linear motion device 116 of laser guided work device 110 may include groove 124*b* defined in work surface 114 and extending along dimension $P_3$, which runs horizontally (perpendicular to dimension $P_1$) along the bottom of work board 112. Laser 118/tongue 126 assembly may be engaged with groove 124*b* such that line 120 is projected on work surface 114 perpendicular to dimension $P_3$. In this configuration, work surface 114 may be used in either a landscape orientation (with the longer length of the board extending horizontally as in FIG. 10) or in a portrait orientation (with the longer length of the board extending vertically as in FIG. 9).

Furthermore, additional laser 118/tongue 126 assemblies may be added to any of the grooves to provide multiple guiding laser lines. For instance, two lasers may be positioned in the vertical grooves to provide guide lines for the bottom and the top of the letters being written on the paper. In addition, one laser may engage the vertical groove and another may engage the horizontal groove, thereby providing a horizontal guide line and a vertical guide line. The horizontal line may guide the writing of the letters on a straight line, while the vertical line would guide the writer in the spacing between letters and words.

Although not illustrated in FIGS. 4–5 and 8–10, work device 110 may also include one or more gauges associated with one or more of dimensions $P_1$, $P_2$ or $P_3$.

Although the illustrated embodiments show use of only a few different types of linear motion devices, any device capable of moving the laser along the dimension is contemplated. For instance, the linear motion device may include end-supported single or double rail systems, continuously supported single or double rail systems, screw activated systems, profile rails, or other like devices.

Figure 12:
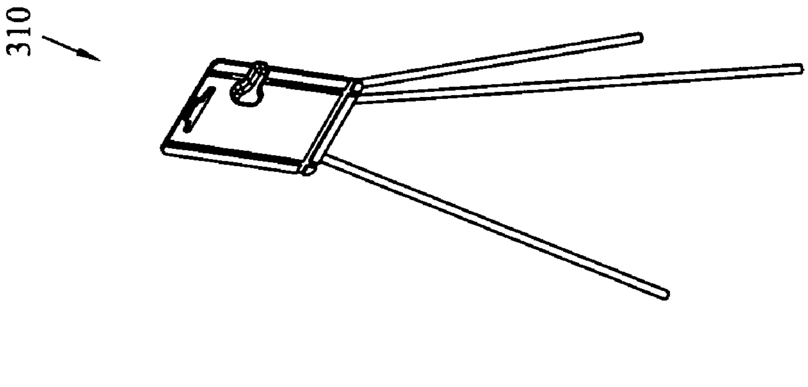
FIG. 12 is a perspective view of a device according to yet another embodiment of the present invention.

In addition to providing a laser-guided work surface for use in writing greeting cards, invitations, or letters, the device of the present application may be adapted for many uses in a variety of settings. For instance, as shown in FIG. 1, device 210 may be used in a classroom or other instructional setting. In this case, the work board may be adapted for mounting on a wall, an easel or rolling stand. The work board may be formed of any material that provides a surface on which the user can directly write. For instance, the work board may be formed of a plastic-coated material, as in a dry erase board, or of a porcelain coated material, as in a chalk board. In this case, the work board does not need the holding device. A similar device may be used as an erasable menu board at a restaurant. The work board may also be adapted for use as a laptop, table top, or easel mount device (FIG. 12, 310). It may be used as a work surface on which a sign may be made. The laser line may be used to guide the placement of letters and characters on the sign. The device may also be adapted for use in drafting. In this case, the laser may be configured to adjust the angle of the laser line.

In another embodiment, both the laser and the linear motion device may be sold together in an assembly separate from the work board. In this case, the linear motion device might resemble linear motion device 16 of FIGS. 1 and 2, except that rail supports 24 would include or be replaced by fasteners designed to be permanently or removably fastened to a work board. For instance, rail supports may include suction cups or brackets designed to removably attach the linear motion device 16 to a work board, such as a chalk board. Alternatively, the linear motion device may be configured to be clamped on in a fashion similar to conventional adjustable spreader/bar clamps. In this case, the bar of the clamp would serve as the rail to which the trolley and laser are slideably mounted. A clamp would be attached to each end of the rail and at least one clamp would be slidably attached to the rail. The slidable clamp would slide along the rail until both clamps firmly bear against the edge of the board thereby mounting the rail to the board. The slidable clamp would also allow the accommodation of various board sizes. In this embodiment, the laser/linear motion device could be removably attachable to a work board thereby providing portability and accommodating various types of work boards. Furthermore, the removably attachable laser/linear assembly could be retrofit to existing work boards, such as chalkboards and dry erase boards.

The present invention further contemplates a design that would not require a work board. Referring now to FIGS. 13–16, such an embodiment will now be described. Laser guided work device 410 includes elongated main body 412 having first end 414 and second end 416. Body 412 includes rail 420 extending between first and second ends 414, 416. Body 412 includes lip 426 extending from an edge of body 412 along the longitudinal length of body 412 between first and second ends 414, 416. Lip 426 is defined, at least in part, by first end 428, opposite second end 430, outermost edge 432, and paper bearing surface 434. Paper bearing surface 434 slopes downwardly moving from body 412 to outermost edge 432. Body 412 also includes stop member 436, the function of which is described in further detail below. Stop member 436 extends along the length of body 412 and is disposed proximal lip 426. Body 412 may also include gripping portions 435 on the bottom surface. Gripping portions 435 may be in the form of rubber ribs protruding from the bottom surface of body 412. When body 412 is placed on a table or other surface, gripping portions 435 may help prevent body 412 from sliding about on the table surface.

Trolley 422 is slideably mounted on rail 420 such that trolley 422 slides along rail 420 between first and second ends 414, 416 of body 412. As shown in FIGS. 13–16, rail 420 is in the form of a protruding rib having a circular cross section. It should be understood that rail 420 could having varying shapes and forms, for instance, rail 420 could be a protruding ridge having a rectangular, dove-tail or other shaped cross section. Alternatively, rail 420 could in the form of a groove defined in body 412. Trolley 422 includes locking member 424 which is adapted to lock trolley 422 in position on rail 420. More particularly, locking member 424 is in the form of a set screw. When tightened, locking member 424 extends through trolley 422 and bears against rail 420 to prevent trolley 422 from sliding on rail 420. When loosened, locking member 424 disengages rail 420 to thereby allow trolley 422 to slide on rail 420. Although locking member 424 is illustrated as a set screw in the illustrated embodiments, the present invention contemplates any locking, braking or stopping device capable of selectively preventing trolley 422 from sliding on rail 420. For instance, locking member 424 may be in the form of a pressure clamp.

Laser 452 is mounted on trolley 422 and is adapted to project an image downward as is described in further detail below. Laser 452 may be mounted on trolley using any means or device including brackets, screws, adhesive or other fastening means. Laser 452 is a line producing laser adapted to project a line on a surface. Laser 452 may be any size, color or wavelength. Laser 452 may have interchangeable tips capable of projecting a variety of designs. For instance, one tip may produce a line, while other tips may produce double lines, geometric shapes, geometric patterns, letters, symbols, messages, grids or drawings.

Figure 13:
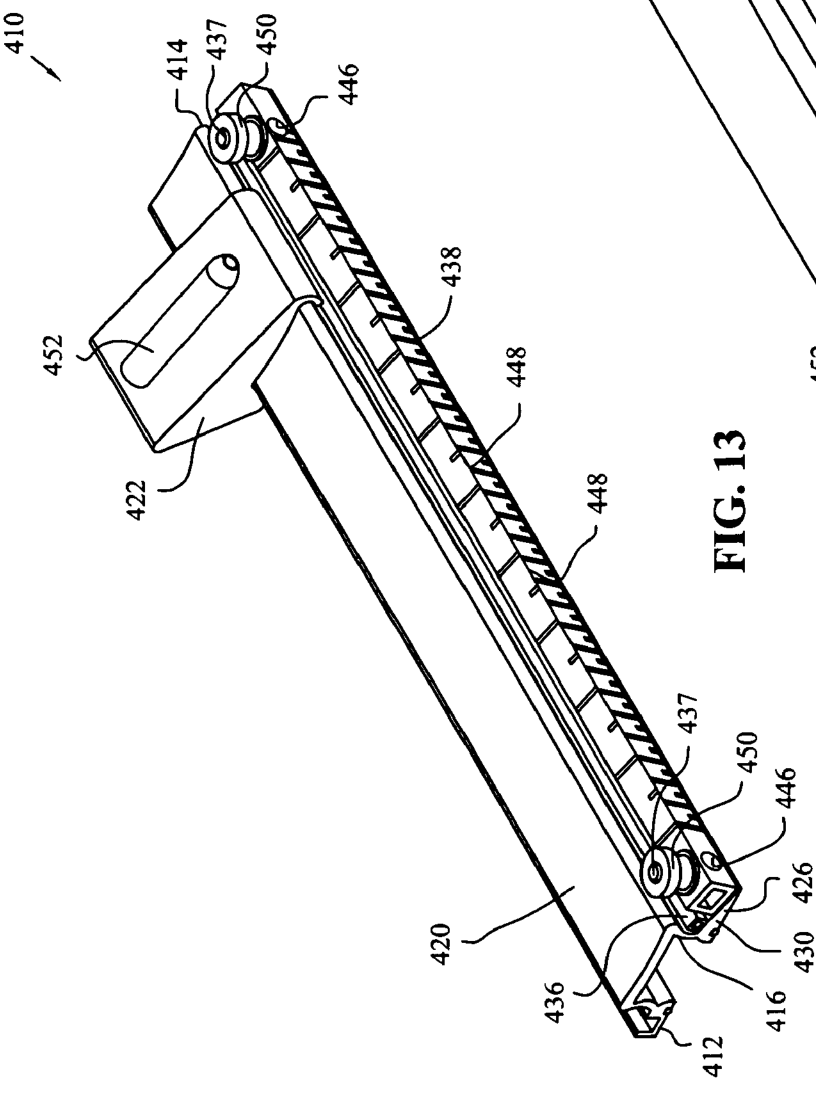
FIG. 13 is a perspective view of a device according to yet another embodiment of the present invention.
Figure 14:
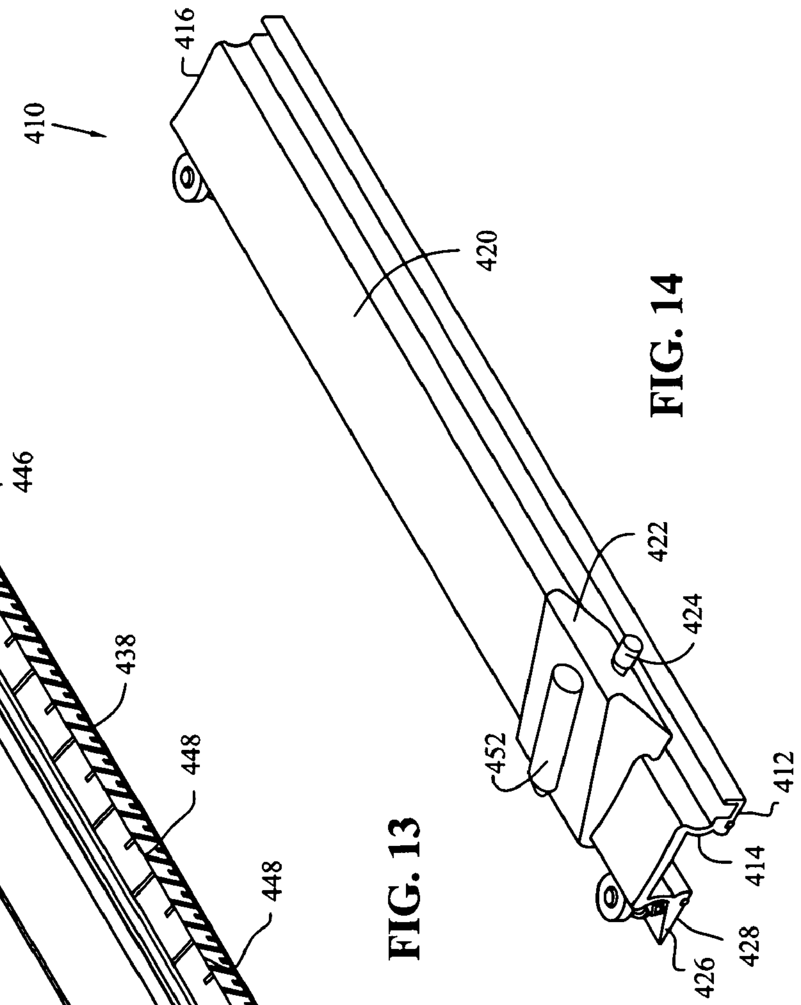
FIG. 14 is another perspective view of the device of FIG. 13.
Figure 15:
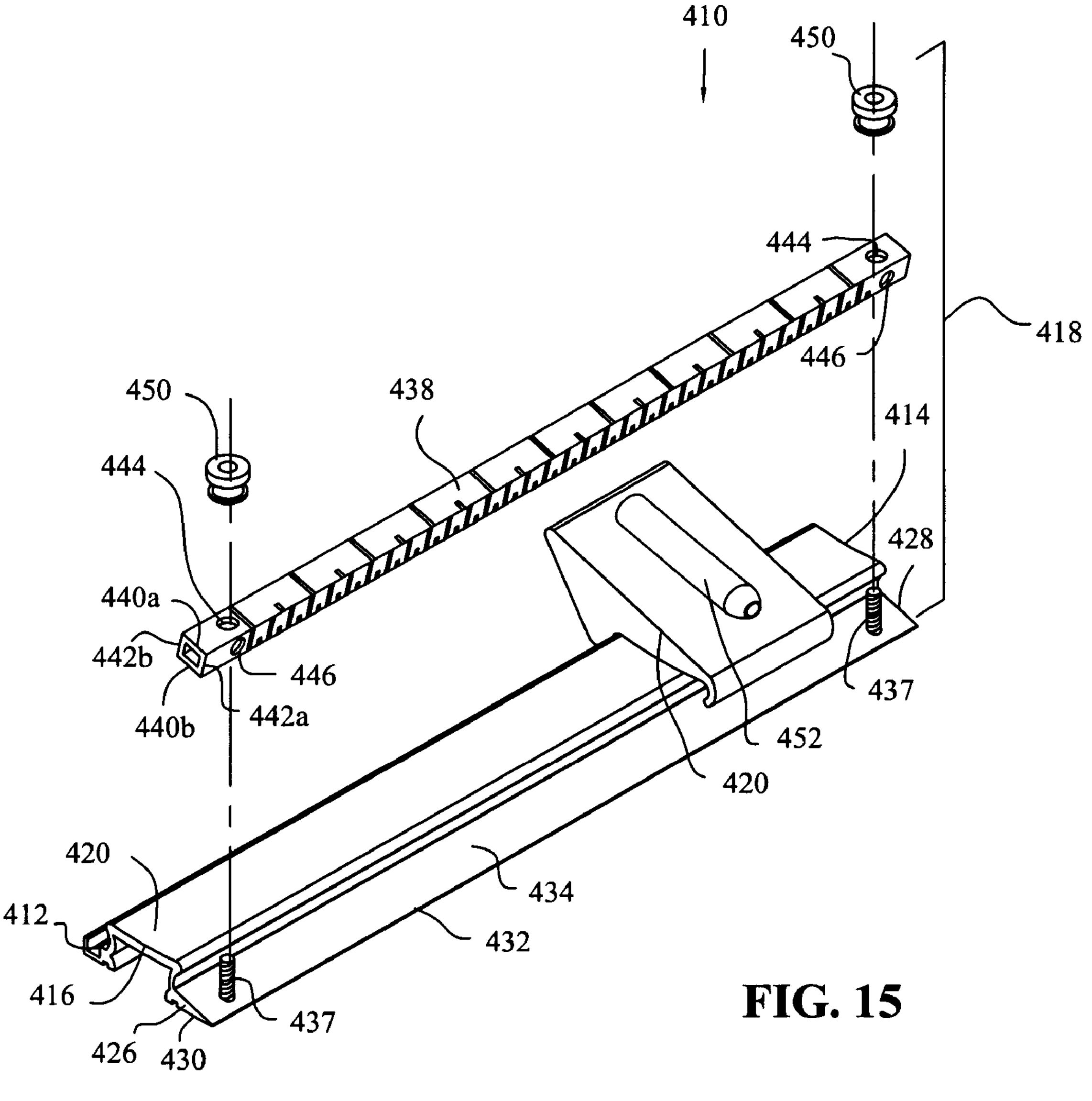
FIG. 15 is an exploded view of the device of FIG. 13.

Referring particularly to FIGS. 13–15, laser guided work device 410 also includes holding device 418 adapted to hold a paper against paper bearing surface 434 of lip 426. Holding device 418 includes a pair of fasteners 437, retention member 438, and a pair of securing members 450. Fasteners 437 include a threaded post or bolt protruding upwardly from first and second ends 428, 430 of lip 426.

Figure 18A:
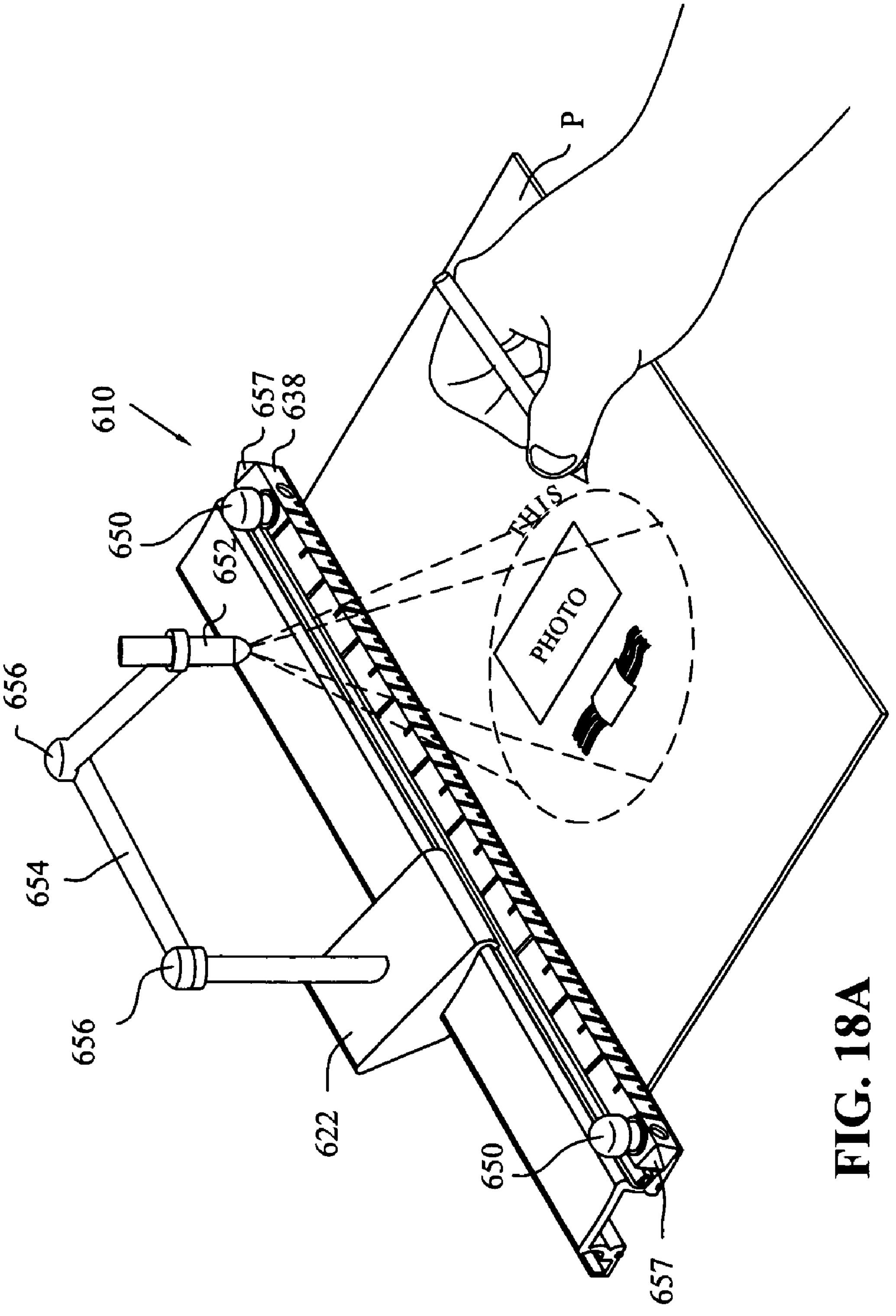
FIGS. 18A–B are perspective views of a device according to still another embodiment of the present invention.
Figure 18B:
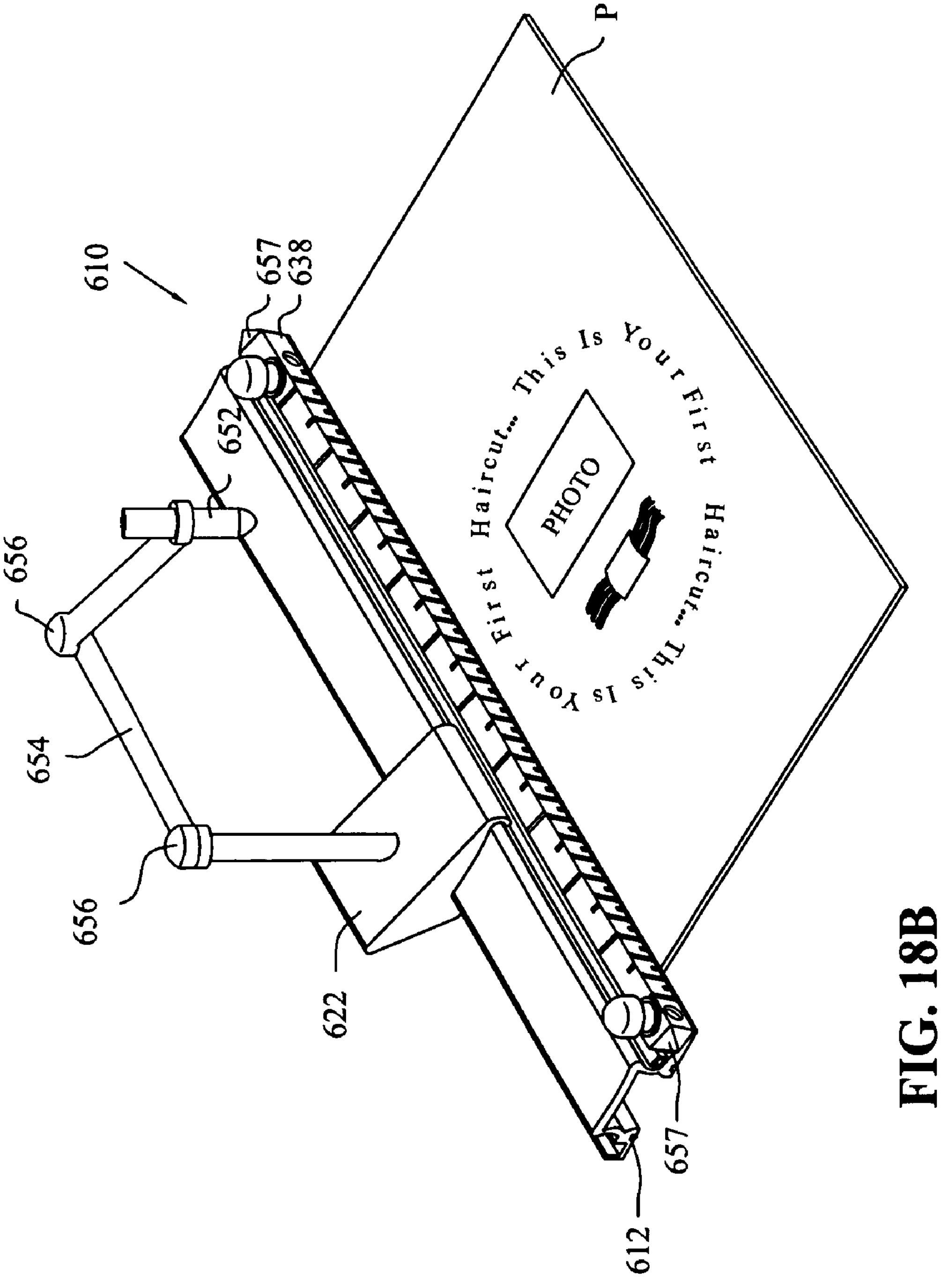

Retention member 438 is an elongate bar, which is rectangular in cross-section and has a first pair of opposing sides 440*a*, 440*b* and a second pair of opposing sides 442*a*, 442*b*. Retention member 438 includes first pair of fastener openings 444, which extend through retention bar 438 between opposing sides 440*a*, 440*b* and at opposite ends of retention bar 438. Retention member 438 also includes second pair of fastener openings 446, which extend through retention bar 438 between opposing sides 442*a*, 442*b* and at opposite ends of retention bar 438. Fastener openings 444, 446 are sized and configured to receive fasteners 437. Each of first and second pairs of opposing sides 440*a*–*b*, 442*a*–*b* include measurement markings 448 indicating a scale of measurement. The scale of measurement indicated by markings 448 may differ from side to side. For instance, measurement markings 448 on side 440*a* may include English scale markings such as inches, while measurement markings 448 on side 442*a* may include metric scale markings such as centimeters. Although not illustrated, retention bar 438 may have a cross-sectional shape other than rectangular. For instance, hexagonal, or pentagonal cross-sectional retention bar 438 may have a rounded, elliptical, shape. The hexagonal and pentagonal cross-sectional shapes provide retention bar with additional sides for displaying additional measurement scales. In addition, laser guided work device 10 may be sold with multiple interchangeable retention bars having varying shapes and measurement scales. As shown in FIGS. 18A and 18B, retention bar 638 may have handles 657 on opposite ends to facilitate the removal and exchange of bar 638.

Securing member 450 is a threaded member adapted to be threadably secured to the free end of fastener 437. As shown in FIGS. 13–15, securing member 450 may be in the form of a knurled thumb nut. Alternatively, securing member 450 may be in the form of a wing nut, acorn nut, or a decorative nut-like fastener. For instance, as shown in FIG. 18A, securing members 650 are in the form of a threaded nut having an elliptical or rounded closed end.

Figure 16:
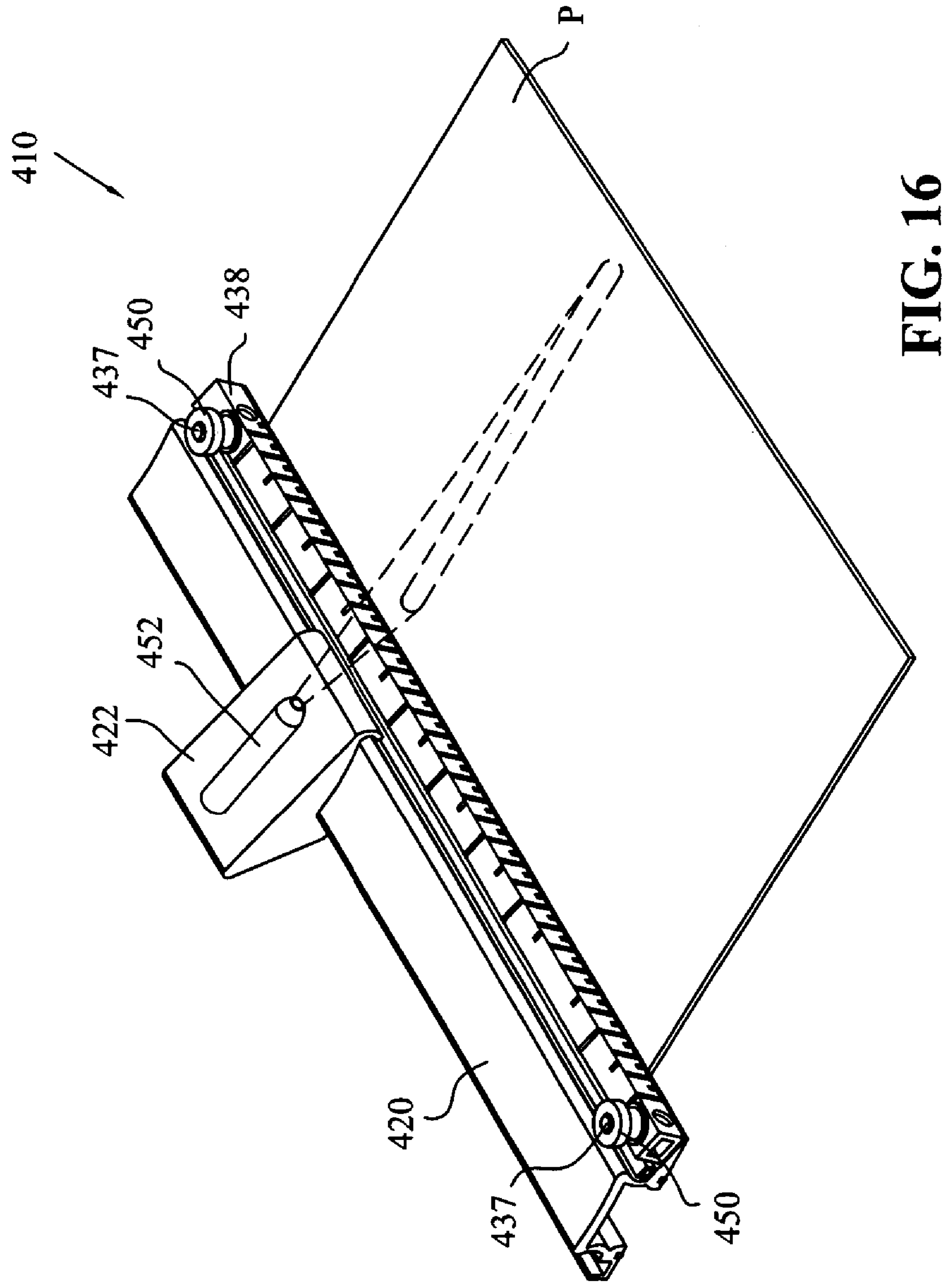
FIG. 16 is a perspective view of the device of FIG. 13 in use with a piece of paper.

Referring now to FIGS. 15 and 16, operation of laser guided work device 410 will now be described. First, securing members 450 are loosened about fasteners 437 to allow retention bar 438 to be raised away from lip 426 of body 412. Paper P is then placed atop bearing surface 434 of lip 426 and under retention bar 438. Paper P may be any structure on which the user would like to project the laser image. Paper P may be a sheet of paper, cardboard, envelope, card, sign, book or other structure. Although not necessary, securing members 450 and retention bar 438 may be completely removed from fasteners 437, as illustrated in FIG. 15. Alternatively, securing members 450 may be loosened about fasteners 437 just enough to allow retention bar 438 to be raised away from lip 426 a distance sufficient to allow paper P to be inserted under retention bar 438.

Paper P is slid over surface 434 toward body 412 until the edge of paper P contacts stop member 436. Stop member 436 provides an alignment and stop surface that aids in the alignment of paper P and prevents paper P from folding upward into rail 20. The slope of surface 434 provides a gradual transition from lip 426 to the surface of the table on which device 410 is placed. Thus, the slope of surface 434 helps to prevent paper P from bending, folding or deforming at the point where paper P first contacts lip 426. Once paper P is positioned atop surface 434, retention bar 438 is engaged to lip 426 by inserting fasteners 437 into either of first or second pair of openings 444, 446. The user may choose either of first or second pair of openings 444, 446 based on which measurement markings are desired to be displayed. For instance, if measurement markings 448 on side 440*a* are desired, fasteners 437 are inserted through openings 444 from side 440*b* to side 440*a*. Retention bar 438 slides down until side 440*b* bears against paper P, thereby gripping paper P between bar 438 and lip 426. Securing members 450 are then threadedly secured to the ends of fasteners 437 to secure retention bar 438 to lip 426, thereby securing paper P in position.

Once paper P is in position, laser 452 is turned on to project its image on paper P. For example, the image in FIG. 16 is a line L. Laser 452 and, thus, line L may be positioned in the desired location by loosening locking member 424 and sliding trolley 422 along rail 420. Measurement markings 448 may aid in determining the desired location of line L.

Figure 17:
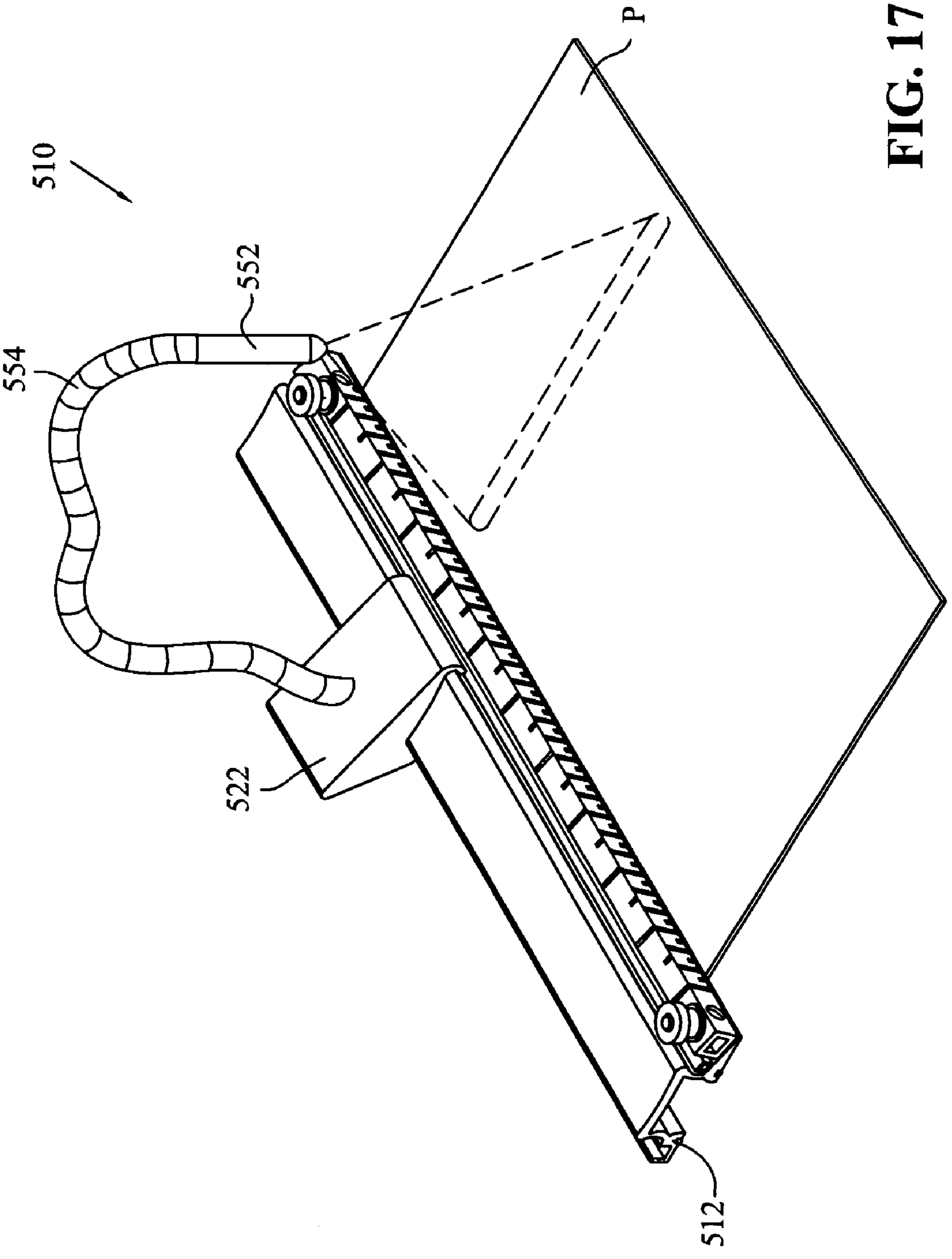
FIG. 17 is a perspective view of a device according to another embodiment of the present invention.

Turning now to FIG. 17, laser guided device 510 is shown in which laser 552 is coupled to trolley 522 by an adjustable arm 554. Adjustable arm 554 may be in the form of a flexible, formable tube as shown in device 510. Alternatively, as shown in FIG. 18A, laser guided device 610 includes laser 652 coupled to trolley 622 by adjustable arm 654. Adjustable arm 654 is in the form of a jointed arm having joints 656, which may be ball/socket joints or other joints that allow arm 654 to pivot at joints 656. Adjustable arm 654 may include any number of joints 656 and joints 656 may be located at any position along arm 654, including at the union of arm 654 and trolley 622. Adjustable arms 554 and 654 allow respective lasers 552 and 652 to be moved toward or away from paper P, thus allowing the image projected by lasers 552, 652 to be enlarged or reduced. Furthermore, adjustable arms 554, 654 position the lasers directly above paper P, thus the image projected on paper P is not deformed. This is particularly helpful when projecting letters, symbols, drawings and other such images.

Referring now to FIGS. 18A and 18B, a particular use of laser guided device 610 will now be described. Laser 652 is adapted to produce a geometric shape, such as a circle, into paper P. The user can use that circle image as a guide for drawing, writing, cutting or other activities. For instance, in scrapbooking, users may want to be creative in the way they memorialize certain events. As shown in FIG. 18A, the user uses the circle image as a guide for writing a message pertaining to the photo on paper P. The user positions the photo and samples of her baby's hair within the circle image and secures the photo and hair to paper P. The user then writes a message narrating the photo on the line forming the circle image. When laser 652 is turned off, the user is left with a creative and artistic work memorializing the event of her child's first haircut.

Figure 19A:
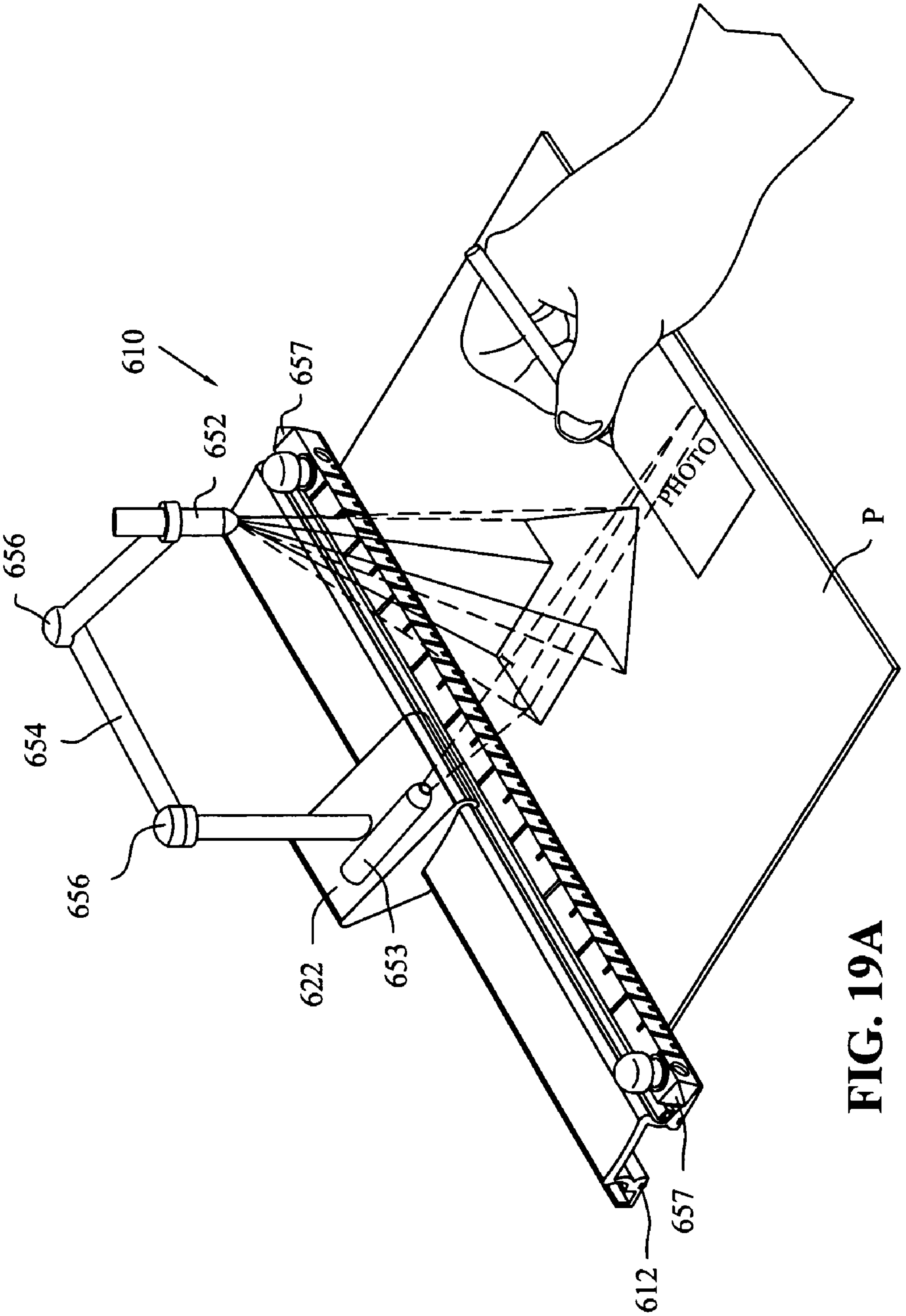
FIGS. 19A–B are perspective views of a device according to still another embodiment of the present invention in use.
Figure 19B:
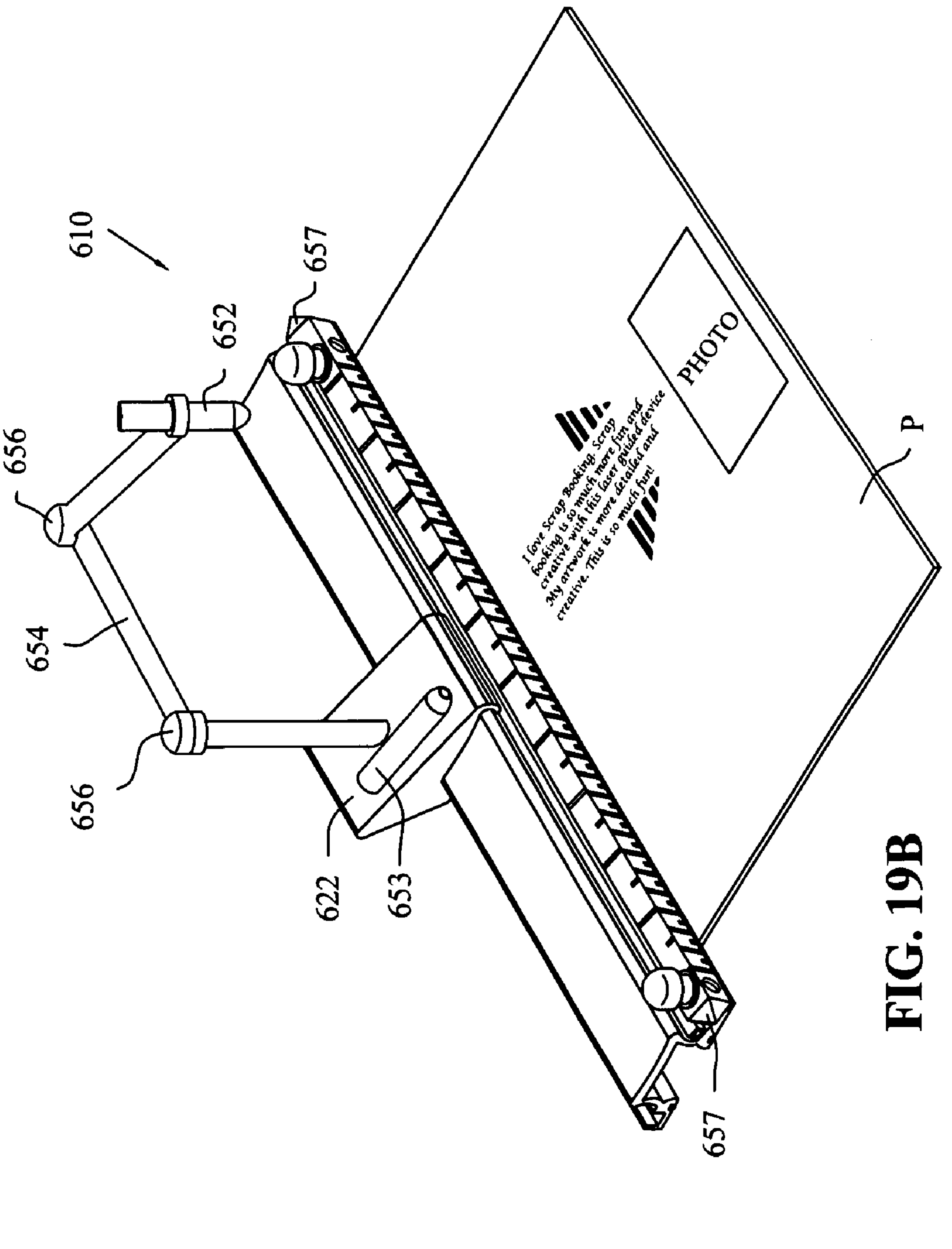
Figure 21:
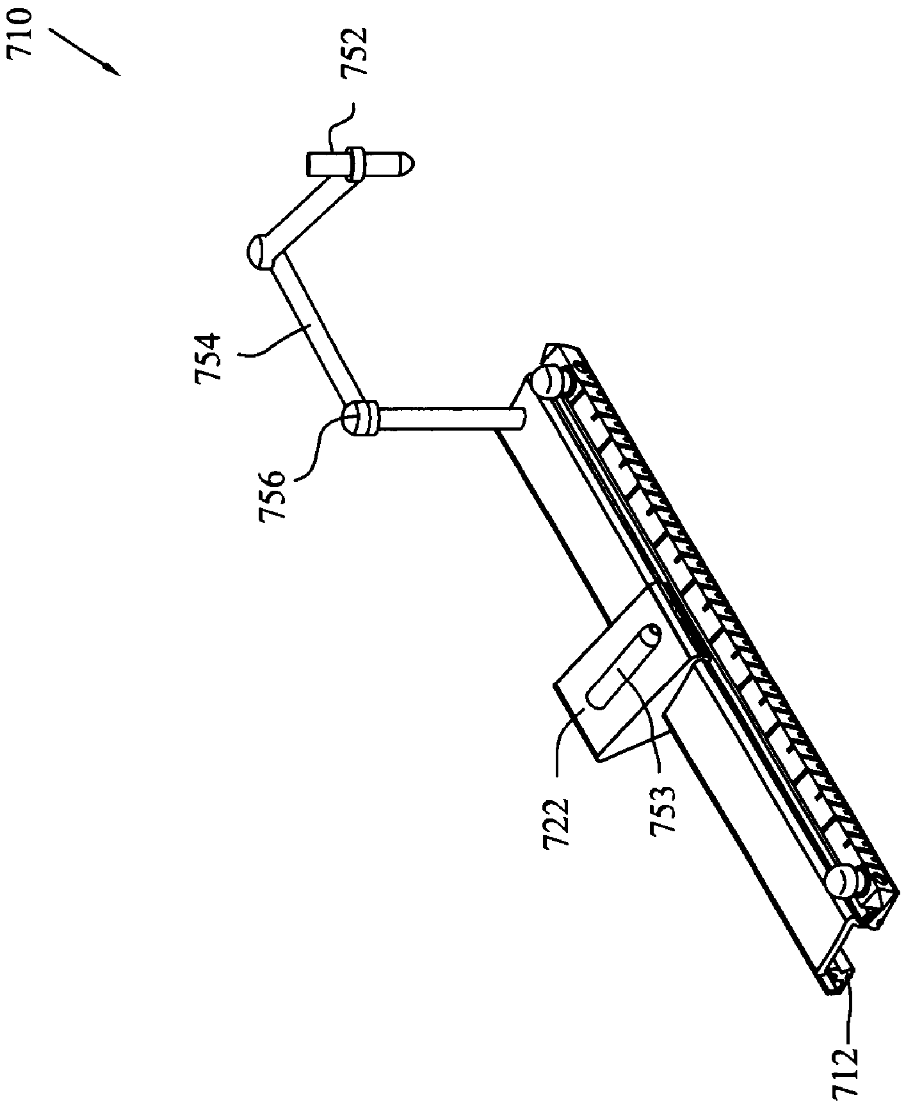
FIG. 21 is a perspective view of a device according to another embodiment of the present invention.

Referring now to FIGS. 19A and 19B, the present invention may also be adapted to have multiple lasers mounted on the trolley or body. For instance, laser guided device 610 includes line producing laser 653 mounted directly on the trolley. Laser guided device 610 also includes image producing laser 652 mounted to the trolley 622 via adjustable arm 654. Alternatively, as shown in FIG. 21, laser guided device 710 may include laser 753 mounted directly on trolley 722 and laser 752 mounted via adjustable arm 754 at some location on body 712. In this configuration, laser 753 may be moved along with trolley 722, while laser 752 remains stationary. Alternatively, the adjustable arm may be mounted on a separate trolley (not shown) that translates along a separate track (not shown) such that the two lasers may be moved independently of one another. These embodiments allow the projection of multiple images onto the paper. Furthermore, the multiple lasers may project images in different colors to prevent confusion between the projected images.

For instance, laser 652 projects a geometric shape on paper P in the form of an arrow. At the same time line producing laser 653 projects a line onto paper P. The user can write on paper P using both the image and the line as a guide. In this example, the user writes a message using the arrow image to define the boundaries and the line to guide straight writing. As shown in FIG. 19B, lasers 652, 653 are turned off leaving the artistically written message. For this particular activity, it may be beneficial to have adjustable arm 654 mounted directly to body 612 rather than to trolley 622. In this configuration, the image produced by laser 652 can remain stationary, while the position of the line produced by laser 653 can be adjusted by moving trolley 622.

Figure 20A:
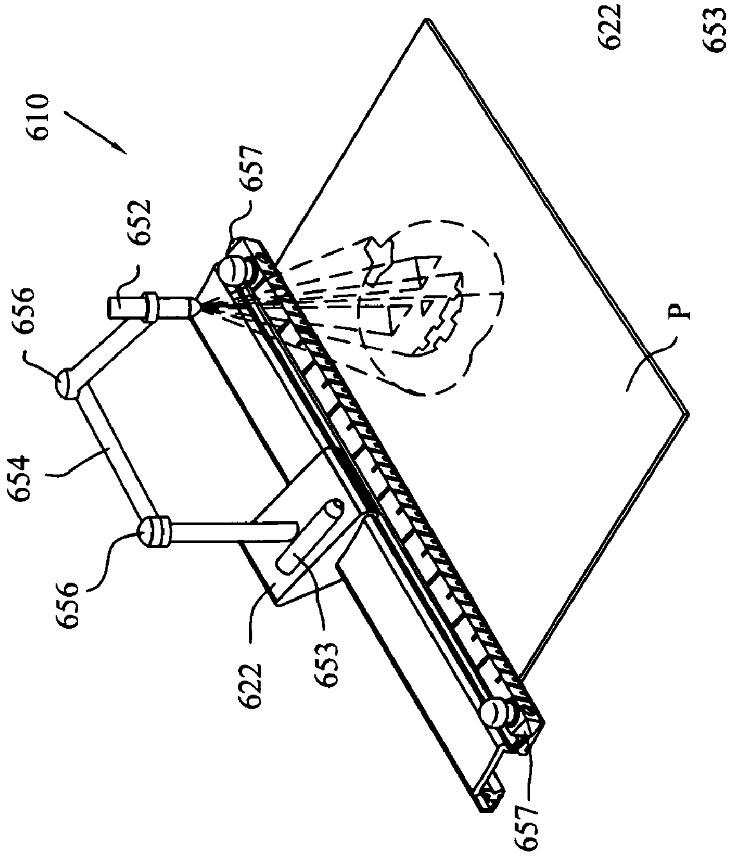
FIGS. 20A–B are perspective views of the device of FIGS. 19A and 19B in use for another purpose.
Figure 20B:
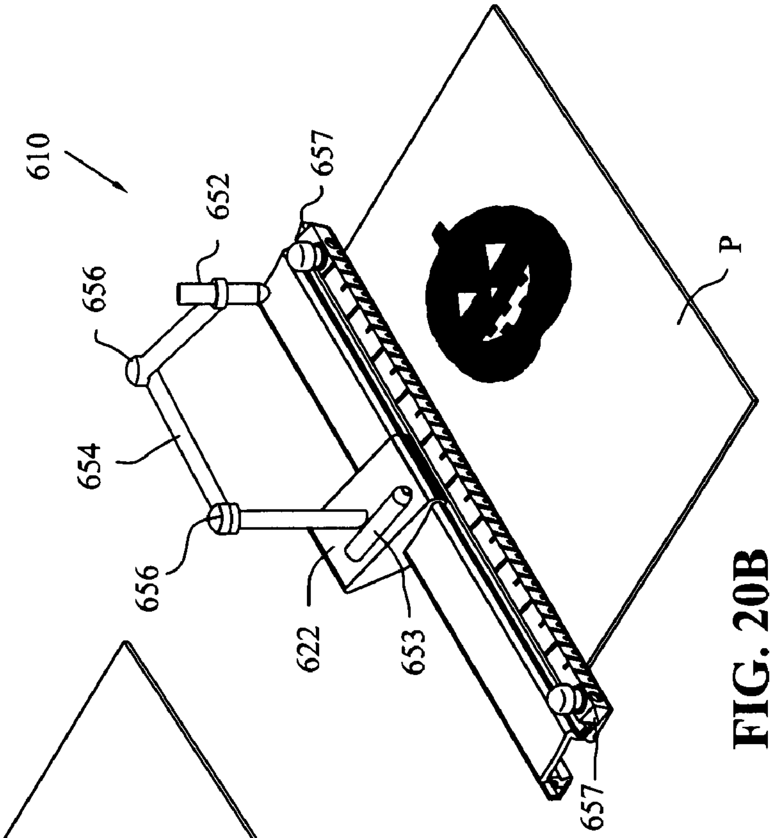

FIGS. 20A–20B illustrate another use of the present invention. Laser 652 of laser guided device 610 is used to project an image, such as a jack-o-lantern on paper P. The image guides the user in coloring in the body of the jack-o-lantern to produce a negative image of the jack-o-lantern.

The laser guided work device illustrated in FIGS. 13–18 may be formed of a variety of materials including steel, plastic, wood or other rigid materials. The device is conveniently compact and can be used on any surface including a desktop, drafting table, or other structure.

The description above demonstrates just a few of the uses of the present invention. It should be understood that the device of the present invention may be used for a variety of purposes and in a variety of settings. For instance, it may be used to guide a writer or calligrapher in writing messages on pre-constructed greeting cards, invitations, or stationary. The device may also be used to form personalized greeting cards, invitations, or stationary that includes written messages and/or artwork The device may also be useful in producing art work such as architectural drafting, interior design, scrapbooking, stamping, die cutting, or other arts. The device may be used to trace images, which may be used to produce artistic objects on a paper or to cut objects from the paper. For instance, the user may trace an image onto and around a photo. The user may then cut around the traced image to produce a photo having a shape. The present device guides the user in making creative, unique and personalized works. The simplifies the process of making such works and can save the artist time and money.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A laser guided work device for guiding the placement of writing or objects on a paper, the laser guided work device comprising:

an elongated main body, said body having a paper-bearing lip extending from a first edge of said body and along a longitudinal length of said body, said lip having an upper surface;

a holding device including at least one fastener coupled to said body and a paper retention member removably coupled to said at least one fastener and adapted to bear against said upper surface and hold the paper between said retention member and said upper surface of said lip; and a laser slidably coupled to said body such that said laser slides relative to said body, said laser adapted to project an image on the paper, wherein said at least one fastener includes a first fastener extending upwardly from a first end of said lip and a second fastener extending upwardly from a second end of said lip, and wherein retention member includes a first opening extending through a first end of said retention member and a second opening extending through a second end of said retention member, said first fastener extending through said first opening and said second fastener extending through said second opening to removably couple said retention member to said lip.

2. The laser guided work device of claim 1 further including a linear motion device slideably coupling said laser to said holding device, said linear motion device including an elongate rail coupled to said body and a trolley slideably coupled to said rail, said laser mounted to said trolley for sliding therewith.

3. The laser guided work device of claim 2 further comprising an adjustable arm coupled to said body at one end and coupled to said laser at an opposite end.

4. The laser guided work device of claim 3 wherein said adjustable arm is coupled to said body through an attachment to said trolley.

5. The laser guided work device of claim 3 wherein said adjustable arm includes at least one joint, said arm pivoting at each of said at least one joint.

6. The laser guided work device of claim 2 wherein said linear motion device further comprises a locking member coupled to said trolley, said locking member having a first locked position wherein said locking member bears against said rail to prevent said trolley from sliding on said rail and a second free position wherein said locking member is free of said rail to thereby allow said trolley to slide on said rail.

7. The laser guided work device of claim 1 wherein said lip has an outermost edge, said upper surface of said lip sloping downward moving from body to said outermost edge.

8. The laser guided work device of claim 1 wherein said retention member includes at least one opening, said at least one opening receiving said at least one fastener.

9. The laser guided work device of claim 8 wherein said at least one fastener is a threaded bolt extending upwardly from said lip, and wherein said holding device further includes a securing member, said securing member threadedly engaged to a free end of said bolt to secure said at least one fastener in said at least one fastener opening.

10. The laser guided work device of claim 1 wherein said retention member is an elongate bar having a substantially rectangular cross-section and defining a first pair of opposing sides and a second pair of opposing sides, said retention member including a primary opening extending through said bar between said first pair of opposing sides and a secondary opening extending through said bar between said second pair of opposing sides, said at least one fastener extending through either one of said primary or secondary openings.

11. The laser guided work device of claim 10 wherein said bar includes measurement markings defined on each of said first and second pair of opposing sides, said measurement markings on each of said first and second pair of opposing sides varying in their measurement indications.

12. The laser guided work device of claim 1 wherein said retention member includes measurement markings.

13. A laser guided work device for guiding the placement of writing and objects on a paper, the laser guided work device comprising:

an elongated main body, said body including an elongate rail and a trolley slideably coupled to said rail;

a holding device including at least one fastener coupled to and extending from said body and a paper retention member, said retention member including at least one opening, said at least one opening receiving said at least one fastener to removably couple said retention member to said body;

an image producing laser coupled to said trolley for sliding therewith along said rail, said laser projecting an image onto the paper, wherein said body includes an elongated lip extending from a first edge of said body and along a longitudinal length of said body, said lip having an outermost edge, said lip having an upper surface, said paper retention member bearing against said upper surface to grip said paper between said paper retention member and said upper surface, said upper surface of said lip sloping downward toward said outermost edge.

14. The laser guided work device of claim 13 wherein said at least one fastener includes a first fastener disposed at a first end of said lip and a second fastener disposed at a second end of said lip, said retention member includes an elongate bar, said at least one opening includes a first opening extending through said bar at one end and a second opening extending through said bar at an opposite end, said first fastener extending through said first opening and said second fastener extending through said second opening to removably couple said bar to said lip.

15. The laser guided work device of claim 14 wherein each of said first and second fasteners is a threaded bolt extending upwardly from said lip, and wherein said holding device further includes a securing member, said securing member threadedly engaging an end of said bolt to secure said first and second fasteners in said first and second openings, respectively.

16. The laser guided work device of claim 13 wherein said retention member includes measurement markings.

17. A laser guided work device for guiding the placement of writing and objects on a paper, the laser guided work device comprising:

an elongated body, said body having an elongated rail, said body having a paper-bearing lip extending outwardly from and along a length of said body, said lip having an outermost edge and sloping downward from said body to said outermost edge, said body including a least one fastener extending upwardly from said lip;

a holding device removably coupled to said lip and adapted to align and hold the paper against said lip, said holding device including an elongate bar, said elongate bar having at least one fastener opening, said at least one fastener extending through said opening to couple said bar to said lip, said bar holding the paper against said lip when said at least one fastener extends through said opening; and an image producing laser coupled to said trolley for sliding therewith along said rail, said laser projecting an image onto the paper when the paper is held against said lip.

18. The laser guided work device of claim 17 wherein said at least one fastener includes a first fastener disposed at a first end of said lip and a second fastener disposed at a second end of said lip, and wherein said at least one opening includes a first opening extending through a first end of said bar and a second opening extending through a second end of said bar, said first fastener extending through said first opening and said second fastener extending through said second opening to removably couple said bar to said lip.

* * * * *